(12) United States Patent
Troy et al.

(10) Patent No.: US 10,438,076 B2
(45) Date of Patent: Oct. 8, 2019

(54) SYSTEM AND METHOD FOR A BIOMETRIC IMAGE SENSOR WITH SPOOFING DETECTION

(71) Applicant: Flashscan3D, LLC, San Antonio, TX (US)

(72) Inventors: Michael Spencer Troy, San Antonio, TX (US); Raymond Charles Daley, Richardson, TX (US); Veeraganesh Yalla, Garland, TX (US)

(73) Assignee: Flashscan3D, LLC, San Antonio, TX (US)

( * ) Notice: Subject to any disclaimer, the term of this patent is extended or adjusted under 35 U.S.C. 154(b) by 0 days.

(21) Appl. No.: 15/213,239

(22) Filed: Jul. 18, 2016

(65) Prior Publication Data

US 2016/0328622 A1    Nov. 10, 2016

Related U.S. Application Data

(63) Continuation of application No. 13/969,555, filed on Aug. 17, 2013, now Pat. No. 9,396,382.

(60) Provisional application No. 61/684,515, filed on Aug. 17, 2012.

(51) Int. Cl.
   *G06K 9/00*      (2006.01)

(52) U.S. Cl.
   CPC ......... *G06K 9/00899* (2013.01); *G06K 9/001* (2013.01); *G06K 9/0012* (2013.01); *G06K 9/00033* (2013.01); *G06K 9/00093* (2013.01); *G06K 9/00107* (2013.01); *G06K 2009/0006* (2013.01)

(58) Field of Classification Search
   CPC ............... G06K 9/00006–00053; G06K 9/00067–0012; G06K 9/00107–0012; G06K 2009/0006; G06K 9/00201–00315
   See application file for complete search history.

(56) References Cited

U.S. PATENT DOCUMENTS

| | | | | |
|---|---|---|---|---|
| 8,401,253 B2 * | 3/2013 | Yamada | ............ | G06K 9/00899 382/118 |
| 8,675,926 B2 * | 3/2014 | Zhang | ................ | G06K 9/00906 382/118 |
| 9,141,844 B2 * | 9/2015 | Yalla | .................. | G06K 9/00006 |
| 2002/0131624 A1 * | 9/2002 | Shapiro | .............. | G06K 9/00013 382/124 |
| 2002/0149467 A1 * | 10/2002 | Calvesio | ............ | G07C 9/00087 340/5.52 |
| 2003/0039382 A1 * | 2/2003 | Yau | ..................... | G06K 9/00067 382/125 |
| 2004/0008875 A1 * | 1/2004 | Linares | .............. | G06K 9/00013 382/124 |
| 2005/0249388 A1 * | 11/2005 | Linares | .............. | G06K 9/00013 382/124 |
| 2006/0120576 A1 * | 6/2006 | Chen | .................. | G06K 9/00033 382/124 |
| 2007/0177774 A1 * | 8/2007 | Kuo | ..................... | G06K 9/00114 382/124 |

(Continued)

*Primary Examiner* — Aaron W Carter
(74) *Attorney, Agent, or Firm* — Loza & Loza, LLP; Jessica W. Smith

(57) ABSTRACT

The system includes a 3D biometric image sensor and processing module operable to generate a 3D surface map of a biometric object, wherein the 3D surface map includes a plurality of 3D coordinates. The system performs one or more anti-spoofing techniques to determine a fake biometric.

18 Claims, 9 Drawing Sheets

(56) References Cited

U.S. PATENT DOCUMENTS

| | | | | |
|---|---|---|---|---|
| 2007/0230754 A1* | 10/2007 | Jain | G06K 9/00093 | 382/125 |
| 2008/0095412 A1* | 4/2008 | Fujieda | G06K 9/00107 | 382/124 |
| 2008/0273768 A1* | 11/2008 | Dennis | G06K 9/0012 | 382/124 |
| 2009/0080717 A1* | 3/2009 | Dias | G06K 9/00013 | 382/124 |
| 2009/0232368 A1* | 9/2009 | Niinuma | G06K 9/00107 | 382/124 |
| 2009/0268951 A1* | 10/2009 | Zhang | G06K 9/00087 | 382/115 |
| 2010/0008552 A1* | 1/2010 | Shin | G06K 9/0012 | 382/124 |
| 2010/0067747 A1* | 3/2010 | Perruchot | G06K 9/0012 | 382/115 |
| 2010/0158319 A1* | 6/2010 | Jung | G06K 9/00255 | 382/106 |
| 2011/0058023 A1* | 3/2011 | Boles | G01B 11/2513 | 348/46 |
| 2011/0058714 A1* | 3/2011 | Hara | G06K 9/00073 | 382/125 |
| 2011/0064282 A1* | 3/2011 | Abramovich | G06K 9/00033 | 382/124 |
| 2011/0216948 A1* | 9/2011 | Yalla | G06K 9/00006 | 382/125 |
| 2011/0218428 A1* | 9/2011 | Westmoreland | A61B 6/00 | 600/425 |
| 2011/0299741 A1* | 12/2011 | Zhang | G06K 9/00228 | 382/117 |
| 2012/0013724 A1* | 1/2012 | McNulty | G06K 9/0012 | 348/77 |
| 2012/0070043 A1* | 3/2012 | Higuchi | A61B 5/1172 | 382/124 |
| 2012/0177257 A1* | 7/2012 | Maev | G06K 9/0002 | 382/124 |
| 2012/0218397 A1* | 8/2012 | Monden | G06K 9/0012 | 348/77 |
| 2013/0136321 A1* | 5/2013 | Lee | G06K 9/0012 | 382/124 |
| 2013/0212655 A1* | 8/2013 | Hoyos | G06K 9/00107 | 726/5 |
| 2014/0037158 A1* | 2/2014 | McNulty | G06K 9/00013 | 382/125 |
| 2014/0049373 A1* | 2/2014 | Troy | G06K 9/001 | 340/5.83 |
| 2014/0153791 A1* | 6/2014 | Kim | G06K 9/0012 | 382/124 |
| 2014/0219521 A1* | 8/2014 | Schmitt | G06K 9/0002 | 382/124 |
| 2014/0241596 A1* | 8/2014 | Chen | G06K 9/00885 | 382/124 |
| 2014/0294262 A1* | 10/2014 | Schuckers | G06K 9/00114 | 382/125 |
| 2015/0161461 A1* | 6/2015 | McNulty | G06K 9/00073 | 382/116 |
| 2015/0379323 A1* | 12/2015 | Erhart | H04N 5/23219 | 382/124 |
| 2016/0328622 A1* | 11/2016 | Troy | G06K 9/001 | |
| 2017/0124385 A1* | 5/2017 | Ganong | G06F 17/30244 | |

* cited by examiner

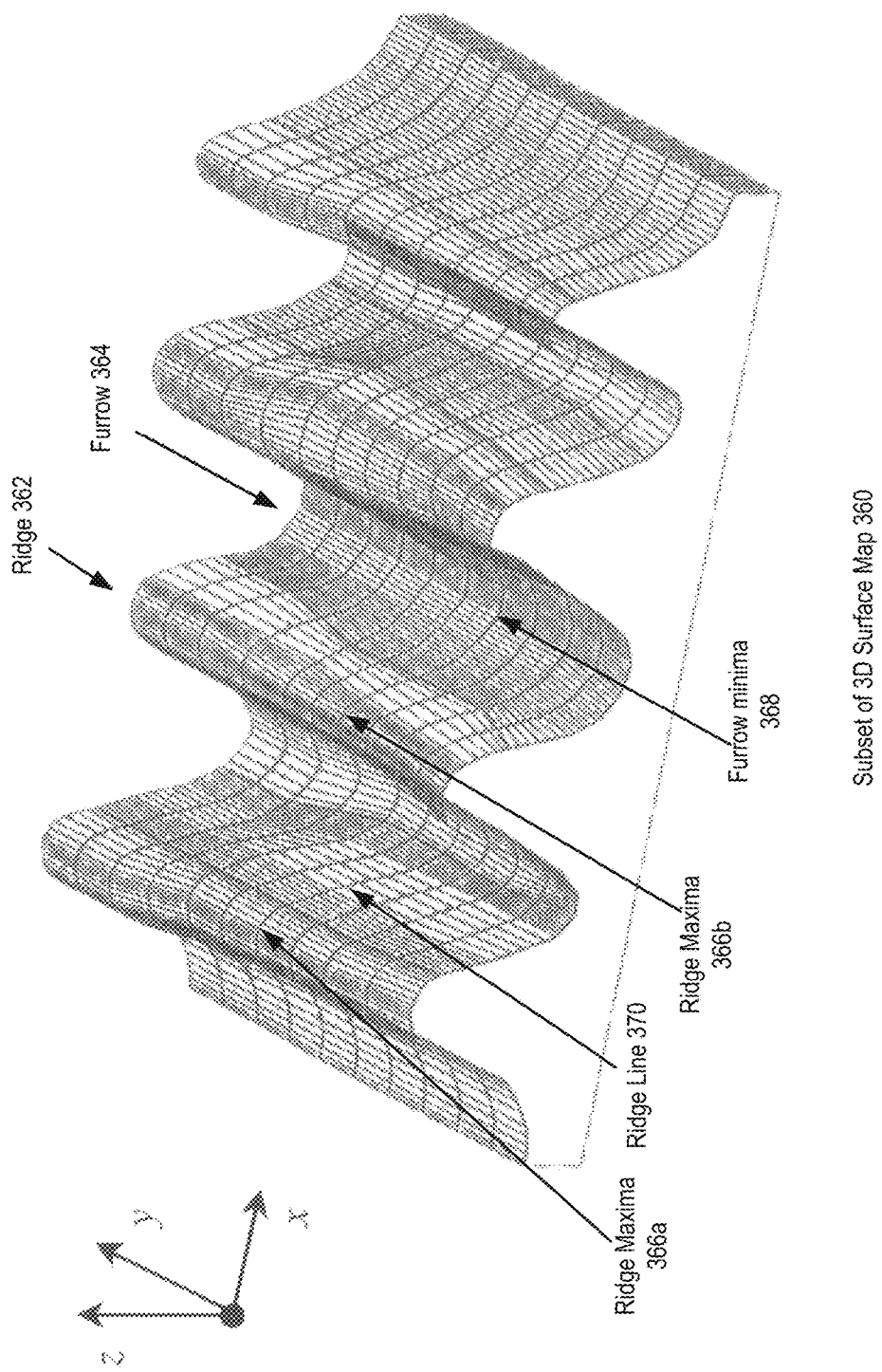

Subset of 3D Surface Map 360

SYSTEM AND METHOD FOR A BIOMETRIC IMAGE SENSOR WITH SPOOFING DETECTION

CROSS-REFERENCE TO RELATED PATENTS

This US patent application claims priority under 35 U.S.C. § 120 as a continuation application to U.S. application Ser. No. 13/969,555, filed Aug. 17, 2013 and entitled, "System And Method For A Biometric Image Sensor with Spoofing Detection," and is hereby incorporated by reference.

This U.S. patent application Ser. No. 13/969,555 claims priority under 35 U.S.C. § 119 as a non-provisional application to U.S. Provisional Application No. 61/684,515, filed Aug. 17, 2012 and entitled, "System And Method For Structured Light Illumination With Spoofing Detection," and is hereby incorporated by reference.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND OF THE INVENTION

Technical Field of the Invention

This invention relates to structured light illumination (SLI) system for three-dimensional (3D) biometric detection and in particular to systems and methods for SLI imaging and processing of biometric data for spoofing detection.

Description of Related Art

Biometrics is the science of measuring and analyzing biological data. In law enforcement and security fields, biometrics is used to measure and analyze human features, such as fingerprints, facial patterns, palm prints, retinas, etc. Currently, binary or two-dimensional fingerprint images are the most relied upon biometric measurement for verifying a person's identity and for linking persons to a criminal history and for background checks. Criminal justice agencies rely on binary fingerprint images for positive identification to latent prints collected as evidence at crime scenes and in processing persons through the criminal justice system.

The National Institute of Science and Technology (NIST) and the American National Standards Institute (ANSI) supports the ANSI/NIST-ITL 1-2000 Data Format for the Interchange of Fingerprint, Facial, & Scar Mark & Tattoo (SMT) Information. This standard defines the content, format, and units of measurement for the exchange of biometric image information, such as fingerprint, palm print, facial/mug shot, and scar, mark, & tattoo (SMT) image information that may be used in the identification process of a subject. The information consists of a variety of mandatory and optional items, including scanning parameters, related descriptive and record data, digitized fingerprint information, and compressed or uncompressed images. This information is intended for interchange among criminal justice administrations or organizations that rely on automated fingerprint and palm print identification systems or use facial/mug shot or SMT data for identification purposes. Other organizations have different standards as well for the content, format or units of measurement for biometric information. The fingerprint and palm-print images meeting specified NIST and ANSI standards allow for matching of print images in large databases of existing fingerprint and palm-print based records. For example, the FBI maintains an Interstate Identification Index System for fingerprints and palm prints. Currently, the biometric image information required by NIST and ANSI standards for fingerprints and palm prints includes only binary biometric images or two-dimensional coordinates of fingerprint features.

In addition, the most common methods of finger print and palm print acquisition collect two-dimensional biometric images. One method is a rolled ink print technique wherein a trained technician manipulates a person's finger or hand on paper to capture an ink print that meets industry standards. Another method is electronic scanning of a finger or palm as it contacts a surface to generate a two-dimensional (2D) binary or gray scale image.

Systems are currently being developed for acquiring biometrics using 3D imaging techniques. Recent advancements in the fields of computing hardware and software have made capturing 3D biometric data a more practical solution. For example, one method of capturing 3D biometric image data is described in U.S. Pat. 8,224,064, entitled System and Method for 3D Imaging using Structured Light Illumination, which is incorporated by reference herein. Another example of capturing 3D biometric image data is described in U.S. patent application Ser. No. 12/991,405 entitled System and Method for Structured Light Illumination with Frame Sub-windows, which is incorporated by reference herein. Another example of capturing and processing 3D biometric image data is described in U.S. patent application Ser. No. 12/717,347 entitled System and Method for Three-dimensional Biometric Data Feature Detection and Recognition, issued as U.S. Pat. No. 8,391,590 and which is incorporated by reference herein.

There is a current need for improvement in SLI systems for capturing 3D biometric images by including anti-spoofing techniques to detect use of fake biometrics.

BRIEF DESCRIPTION OF THE SEVERAL VIEWS OF THE DRAWINGS

FIG. 12a illustrates an embodiment of a subset of a 3D surface map; and

DETAILED DESCRIPTION OF THE INVENTION

One or more embodiments described herein are operable to acquire 3D biometric image data and to detect fake biometrics using anti-spoofing techniques. For example, the use of fake biometrics, e.g. fake fingerprints, palm prints, faces, and features thereof, etc., may be attempted. Commonly, a fake biometric includes a silicone, plastic or claylike substance with an impression of the faked biometric, such as a fingerprint or palm print or the use of a mask or model. One or more embodiments described herein are operable to perform one or more anti-spoofing techniques for detecting a fake biometric.

Figure 1:
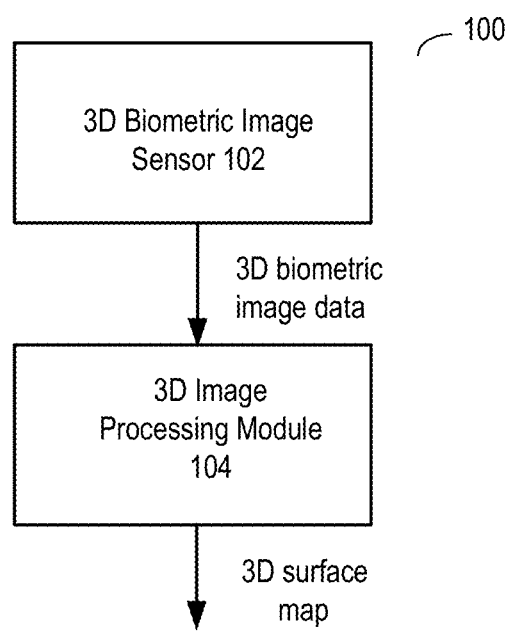
FIG. 1 illustrates a schematic block diagram of an embodiment of a 3D image sensor and processing module.

FIG. 1 illustrates a schematic block diagram of an embodiment of a biometric image system 100 for three dimensional (3D) biometric data collection with spoofing detection. A 3D biometric image sensor 102 captures one or more images of a fingerprint, palm print or other 3D biometric object and generates 3D biometric image data. The 3D processing module 104 analyzes the 3D biometric image data to generate a 3D surface map of the biometric object. The 3D Image Processing Module 104 is also operable to use one or more anti-spoofing techniques to detect a fake biometric object. In another embodiment, the biometric image system 100 may include a 2D biometric image system that includes an image sensor and processing module for capture of 2D biometric images. The 2D biometric image system may employ one or more of the anti-spoofing techniques described herein as well.

Figure 2:
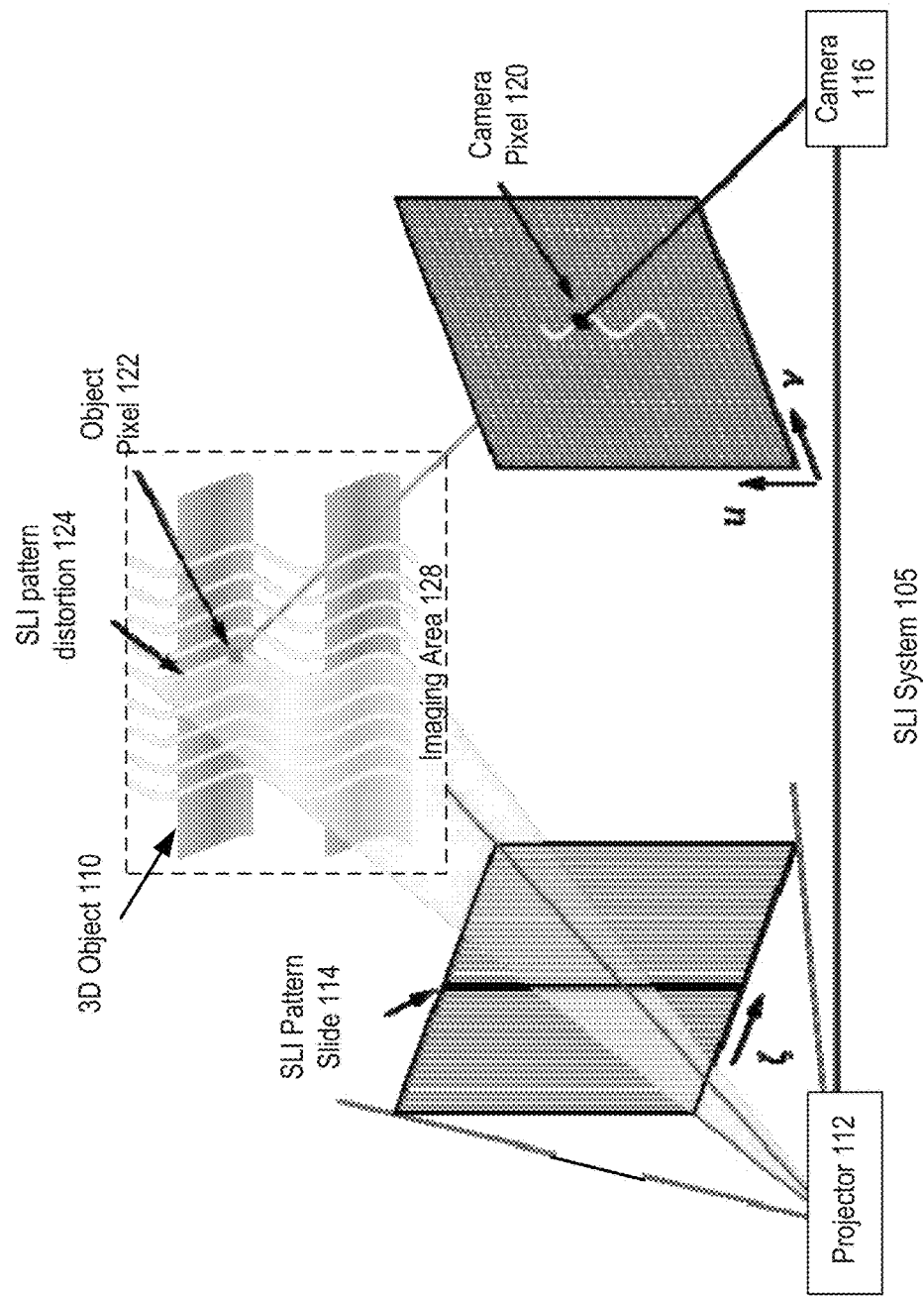
FIG. 2 illustrates a schematic block diagram of an embodiment of an SLI system.

FIG. 2 illustrates a schematic block diagram of an embodiment of a Structured Light Illumination (SLI) system 105 that may be implemented as the 3D biometric image sensor 102. The SLI system 105 includes an SLI pattern projector 112 and one or more cameras 116. The SLI pattern projector includes a digital light processing (DLP) type projector, liquid crystal display (LCD) type projector, light emitting diodes (LED) type projector or other type of projector. The camera 116 includes one or more digital cameras or image sensors operable to capture digital images.

In operation, the SLI pattern projector 112 projects focused light through an SLI pattern slide 114 onto 3D object 110 in imaging area 128. In an embodiment, the imaging is non-contact, e.g. the 3D object is not placed against a platen or transparent surface. In another embodiment, the imaging is performed using a platen or transparent surface with the 3D object 110 placed in contact with the surface during imaging.

In an embodiment, when the SLI pattern is projected onto 3D object 110, the SLI pattern is distorted by the surface variations of 3D object 110 as seen with SLI pattern distortion 124. While the SLI pattern is projected onto 3D object 110, a camera 116 captures an image of the 3D object with the SLI pattern distortion 124. The camera 116 generates a frame composed of a matrix of camera pixels 120 wherein each camera pixel 120 captures image data for a corresponding object point 122 on the 3D object 110. The camera 116 captures one or more images of the 3D object 110 with the distortions in the structured light pattern. Additional SLI slide patterns may be projected onto the 3D object 110 while additional images are captured. The one or more 3D biometric images are then stored in a biometric image data file for processing.

Referring again to FIG. 1, the 3D image processing module 104 processes the 3D biometric image data to generate a 3D surface map of the 3D object 110. The distortions in the structured light pattern are analyzed and calculations performed to determine a spatial measurement of various object points 122 on the 3D object surface. This processing of the images uses well-known techniques in the industry, such as standard range-finding or triangulation methods. The triangulation angle between the camera and projected pattern causes a distortion directly related to the depth of the surface. One or more range finding techniques are used to determine the position of a plurality of points on the 3D object surface. Then a 3D data representation of the 3D object can be created. An example of such calculations is described in U.S. patent application Ser. No. 10/444,033, entitled, "System and Technique for Retrieving Depth Information about a Surface by Projecting a Composite Image of Modulated Light Patterns," by Laurence G. Hassebrook, Daniel L. Lau, and Chun Guan filed on May 21, 2003, issued as U.S. Pat. No. 7,440,590, which is incorporated by reference here.

Figure 12B:
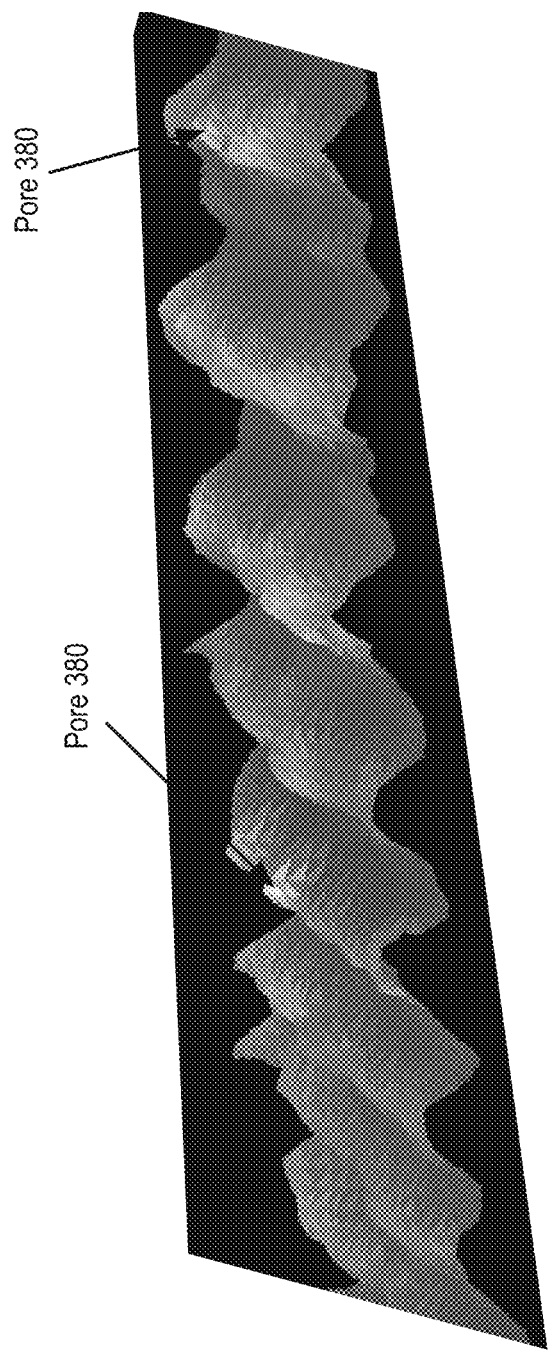
FIG. 12b illustrates another embodiment of a subset of a 3D surface map.

The 3D coordinates for a plurality of object points is determined. Collectively, the plurality of points results in a 3D surface map. Each point in the 3D surface map is represented by 3D coordinates, such as Cartesian (x,y,z) coordinates, spherical (r, $\theta$, $\Phi$) coordinates or cylindrical (y, r, $\theta$) coordinates. In addition, each point includes texture data. Texture data includes color values, such as Red, Green and Blue values. Texture data also includes grey values or brightness values as well. The 3D image processing module thus creates a 3D surface map of the 3D object based on the 3D biometric image data. FIGS. 12a and 12b illustrate examples of a subset of a 3D surface map, as explained below.

Figure 3:
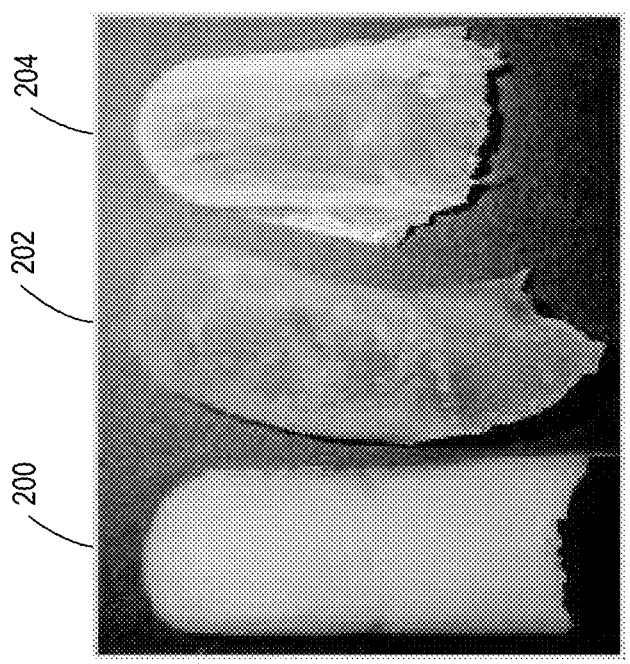
FIG. 3 illustrates an example of fake biometrics for fingerprints.

In an embodiment of imaging of a biometric 3D object (such as fingerprint, palm print, face, etc.), the 3D image processing module 104 processes the 3D biometric image data using one or more anti-spoofing techniques. The anti-spoofing techniques are used to attempt to detect fake biometrics. For the example of a fingerprint, spoofing often includes fingerprint impressions in an overly made of, e.g. plastic, silicone, clay or other type of substances. The fingerprint overlay may be molded into a fingertip-type shape or may overlay a model of a finger made of another substance, such as wood, plastic, etc. In some cases, the fingerprint overlay is molded around a real finger. FIG. 3 illustrates examples of fingerprint overlays 200, 202 and 204 used for fake biometrics.

In another example, fake biometrics in facial recognition may include a mask, prosthetic, scarring, make-up or 3D model of a face. Other fake biometrics, such as a fake palm print, may also be constructed. Another type of fake biometrics involves the use of non-live samples, such as a non-living finger. The anti-spoofing techniques described herein may be implemented in an attempt to detect one or more of these types of fake biometrics or other types of fake biometrics.

Figure 4:
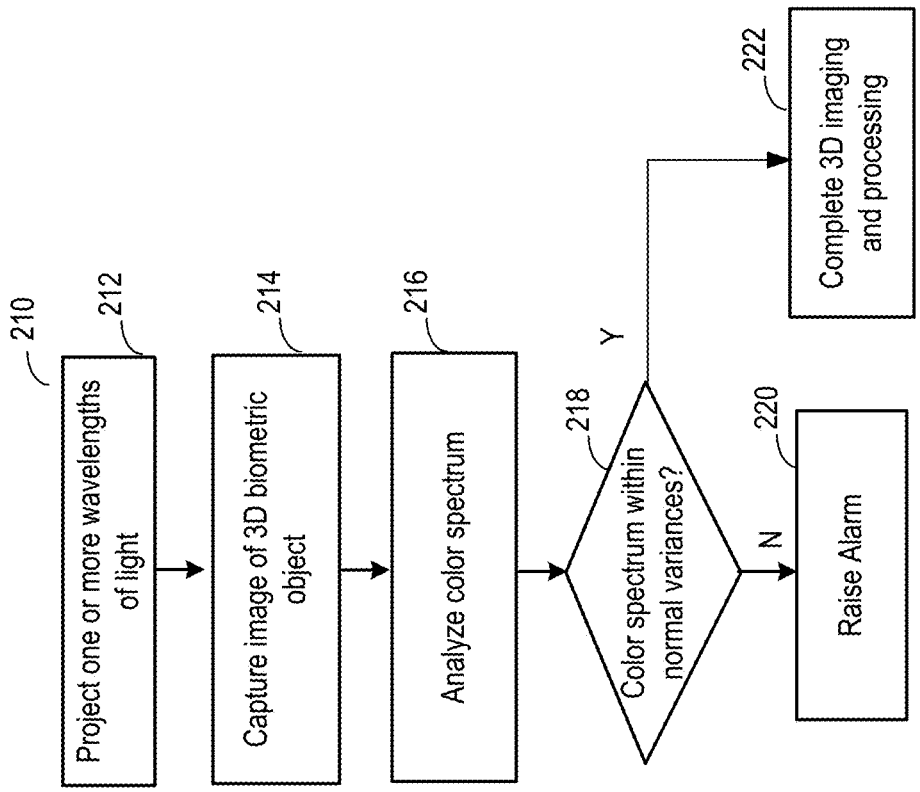
FIG. 4 illustrates a logic flow diagram of an embodiment of a method for an anti-spoofing technique in an SLI system.

FIG. 4 illustrates a logic flow diagram of an embodiment of a method 210 for an anti-spoofing technique. In step 212, one or more colors of light at one or more predetermined wavelengths are projected onto the 3D object by the 3D biometric image sensor 102. For example, red, green and blue light are projected onto the 3D object in succession. In an embodiment, the one or more wavelengths of light are projected in an SLI imaging system as shown in FIG. 2 prior to or after projecting the SLI pattern. In another embodiment, the SLI pattern projected by the sensor 102 comprises the one or more wavelengths of light. The biometric image sensor 102 then captures an image while each of the one or more wavelengths of light are projected onto the 3D object in step 214.

In step 216, the 3D Image Processing Module 104 receives the biometric image data and performs a color spectrum analysis. For normal skin, the reflected wavelengths of light have a color spectrum within measurable normal variances due to the absorbance and scattering characteristics of typical skin layers. When a fake biometric is used, an abnormal color spectrum outside of normal variances may be detected due to differences in the absorbency and scattering characteristics of material of the fake biometric. In step 218, the color spectrum is compared with expected color spectrum for the 3D biometric object. The normal or expected color spectrum and variances for the 3D object are stored in a database or look-up table. When the color spectrum compares unfavorably, e.g. outside of normal variances, an alarm is raised in step 220. For example, when the overlay has a different color, absorbency, texture, the color spectrum will differ from that of normal skin. When the color spectrum compares favorably, the 3D imaging and processing is completed in step 222.

Figure 5:
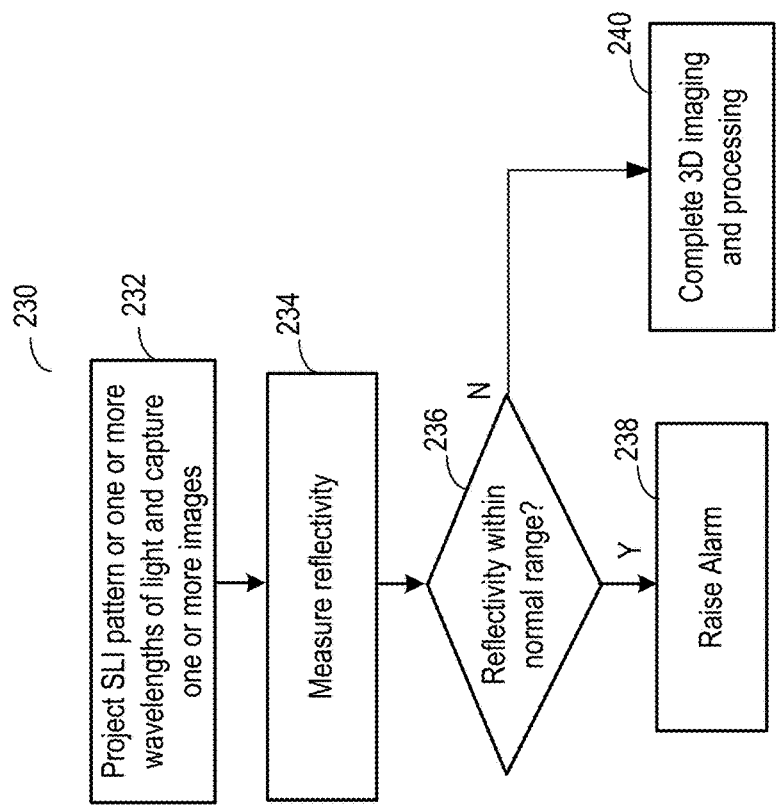
FIG. 5 illustrates a logic flow diagram of another embodiment of a method for an anti-spoofing technique in an SLI system.

FIG. 5 illustrates a logic flow diagram of an embodiment of a method 230 of another anti-spoofing technique. In step 232, a wavelength of light is projected onto the 3D object and one or more images captured by the 3D biometric image sensor 102. In another embodiment, an SLI pattern is projected onto the 3D biometric object during image capture. The 3D image processing module 104 receives the 3D biometric image data and performs a reflectivity analysis. In an embodiment, a non-contact 3D imaging system is used to improve performance of this anti-spoofing technique. When the 3D object is not pressed or placed against a platen or other surface, abnormal reflectivity of a fake biometric is more easily detected.

The 3D image processing module 104 determines an albedo value for a plurality of pixels in one or more portions of the biometric image data in step 234. The albedo value is a measure of a surface's reflectivity and quantifies the intensity of the reflected light (sometimes as a fraction of the incident light). Normal skin of a biometric has a measured reflectivity within a certain range. Often fake biometrics made of translucent materials have a higher reflectivity outside of the range compared to normal skin. Fake biometrics made of opaque material also often have a reflectivity of greater intensity outside the range of normal skin. Due to greater reflectivity, multi-path reflections introduce holes/missing portions within the 3D image data.

Figure 6:
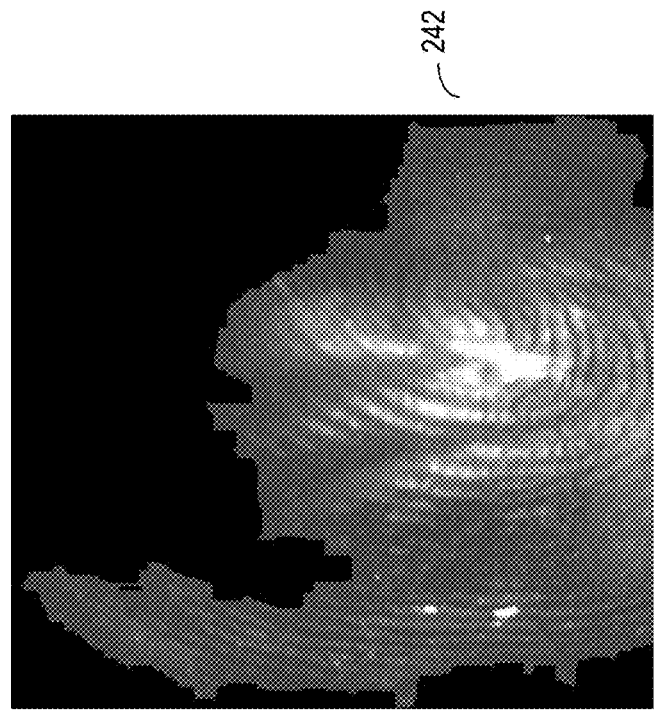
FIG. 6 illustrates an example of a 3D surface map with missing portions of data due to abnormal reflectivity of a fake biometric.

An example of the effect of multi-path reflections from a fake biometric is shown in FIG. 6. FIG. 6 illustrates a texture map 242 of a fingerprint. Portions of the texture map 242 cannot be generated from the 3D image data and are shown as missing or blank. Due to the nature of the materials used in the spoof targets and light reflections between the ridges and valleys, there is significant blurring of the biometric image data. In addition, there can be multi-path reflection between the surface of an overlay and underlying biometric model. Other measures of reflectivity, such as brightness or lightness, may also be used.

The 3D image processing module 104 determines in step 236 whether the reflectivity measurement of the 3D biometric image data is within a normal range. When the reflectivity measurement compares unfavorably, e.g. outside of normal ranges, an alarm is raised in step 238. When the reflectivity measurement compares favorably, the 3D imaging and processing is completed in step 240.

Figure 7:
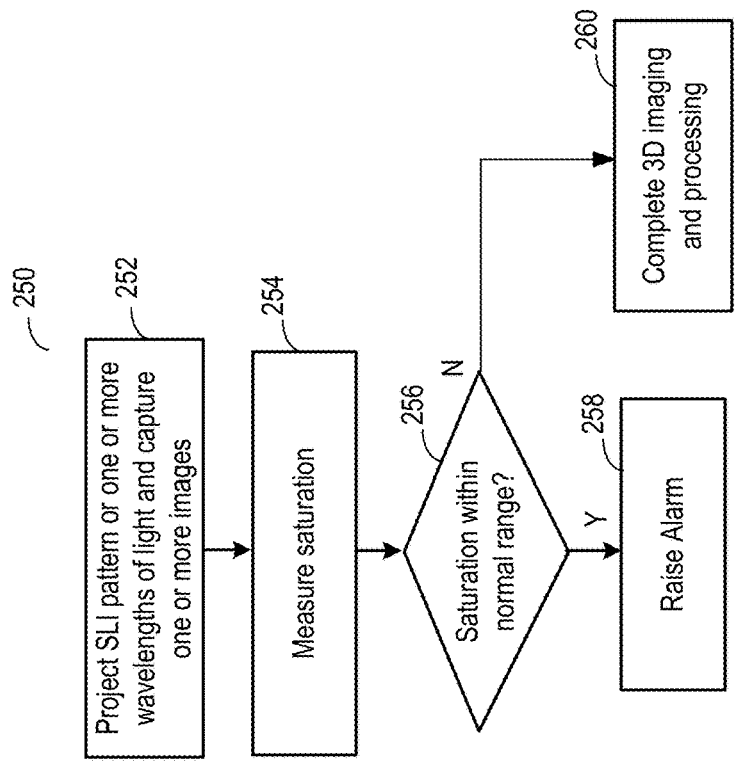
FIG. 7 illustrates a logic flow diagram of an embodiment of a method of another anti-spoofing technique.

FIG. 7 illustrates a logic flow diagram of an embodiment of a method 250 of another anti-spoofing technique. In step 252, a wavelength of light is projected onto the 3D object and one or more images captured by the 3D biometric image sensor 102. In another embodiment, an SLI pattern is projected onto the 3D biometric object during image capture. The 3D image processing module 104 receives the 3D biometric image data and measures saturation, e.g. performs a saturation analysis. The 3D image processing module 104 determines a saturation value for a plurality of pixels in one or more portions of the biometric image data in step 254. The saturation value is a measure of colorfulness relative to brightness or of chroma to lightness. Normal skin of a biometric has a measured saturation level within a certain range. Often fake biometrics have a higher brightness creating a lower saturation level compared to normal skin. The 3D image processing module 104 determines in step 256 whether the saturation level of the 3D biometric image data is within a normal range. When the saturation level compares unfavorably, e.g. outside of normal ranges, an alarm is raised in step 258. When the saturation level compares favorably, the 3D imaging and processing is completed in step 260.

In an embodiment, one or more of the anti-spoofing techniques described herein may be performed on the same 3D biometric image data. For example, reflectivity and saturation measurements may be performed by the 3D image processing module using a texture map or other data generated from the same 3D biometric image data. This alleviates the need to capture further images of a 3D object to perform additional anti-spoofing tests.

Figure 8:
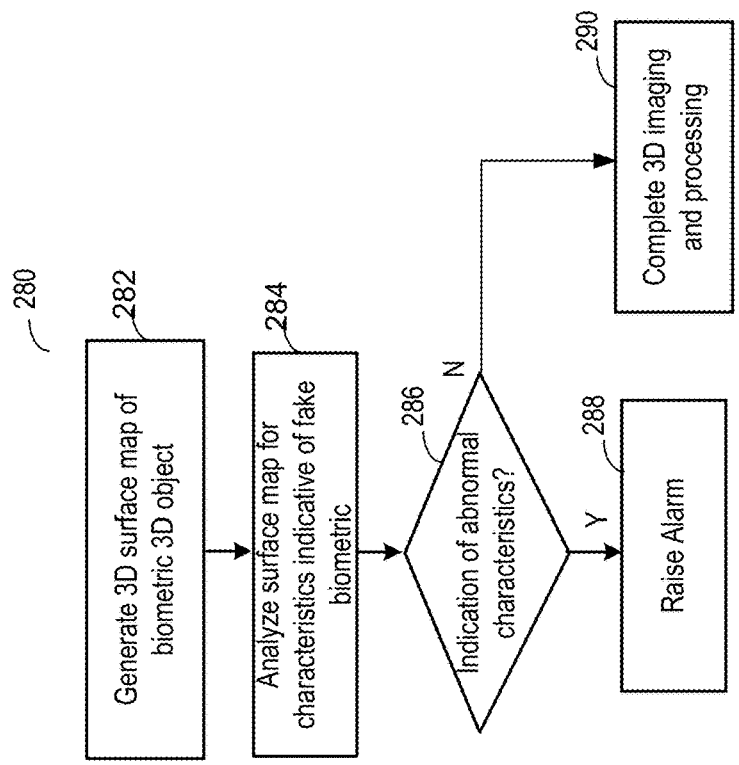
FIG. 8 illustrates a logic flow diagram of an embodiment of a method of another anti-spoofing technique.

FIG. 8 illustrates a logic flow diagram of an embodiment of a method 280 of another anti-spoofing technique for altered features in a fake biometric. For example, a biometric object may be chemically or surgically altered, such as a fingerprint or palm print. Chemical or surgical alterations of prints often result in abnormal characteristics of features, such as ridge continuity or ridge orientation. Using a 3D image sensor, especially a non-contact 3D imaging sensor, is operable to obtain images over a greater area of a finger than a contact imaging sensor. Abnormal characteristics of features, such as regions of surgery, are thus more likely to be detected in the greater imaged area.

The 3D biometric image sensor 102 captures 3D biometric image data and the 3D image processing module generates a 3D surface map in step 282. In step 284, the surface map is analyzed for characteristics of features, such as ridge continuity or ridge orientation that may indicate use of a fake biometric. The 3D image processing module 104 determines in step 286 whether any characteristics are abnormal. When the feature characteristics compares unfavorably, e.g. outside of normal ranges, an alarm is raised in step 288. When the characteristics compare favorably, the 3D imaging and processing is completed in step 290.

Figures 9, 10:
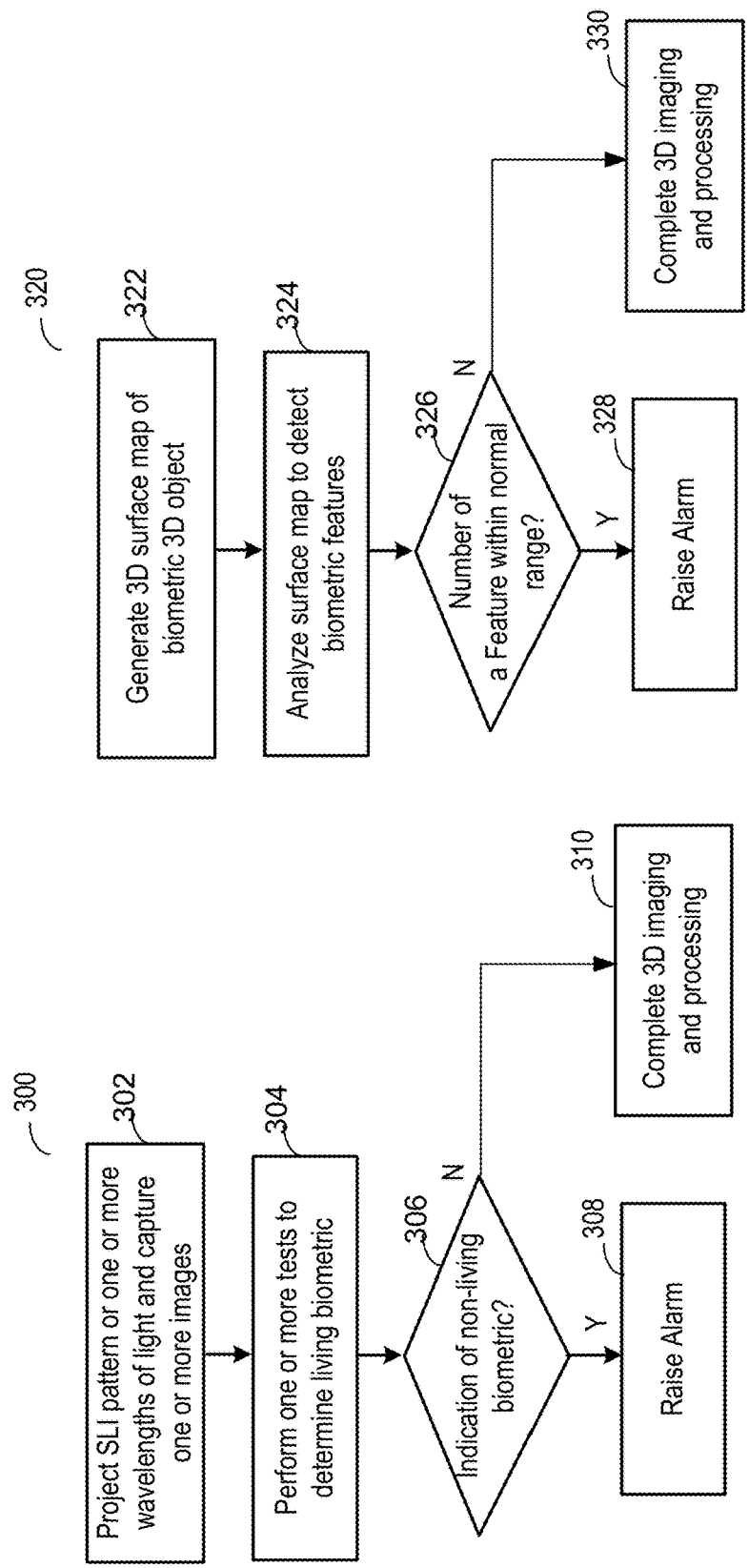
FIG. 9 illustrates a logic flow diagram of an embodiment of a method of another anti-spoofing technique.
FIG. 10 illustrates a logic flow diagram of an embodiment of a method of another anti-spoofing technique based on biometric feature detection.

FIG. 9 illustrates a logic flow diagram of an embodiment of a method 300 of another anti-spoofing technique for detecting a nonliving fake biometric. For example, a dead finger has been used as a fake biometric object. Often tests of liveness include pulse, temperature, etc. In an embodiment, an anti-spoofing test for liveness includes a color spectrum analysis and/or reflectivity and/or saturation test.

In step 302, a wavelength of light is projected onto the 3D object and one or more images captured by the 3D biometric image sensor 102. In another embodiment, an SLI pattern is projected onto the 3D biometric object during image capture. The 3D image processing module 104 receives the 3D biometric image data and performs a color spectrum analysis to determine whether the hue or color spectrum resides within normal variances of a living biometric. A non-living biometric has a different color spectrum due to lack of blood flow or tissue decay. In addition, the texture of the skin alters, such as becoming more flaccid in a non-living biometric, resulting in different reflectivity or saturation levels. In step 304, one or more anti-spoofing tests are performed on the 3D object to determine a living biometric, such as color spectrum, reflectivity and saturation. The 3D image processing module 104 determines in step 306 whether any characteristics indicate a non-living biometric object. When the characteristics compare unfavorably, e.g. outside of normal ranges, an alarm is raised in step 308. When the characteristics compare favorably, the 3D imaging and processing is completed in step 310.

FIG. 10 illustrates a logic flow diagram of an embodiment of a method 320 of another anti-spoofing technique based on biometric feature detection. Depending on the biometric object, certain features are expected to be found in the 3D biometric image data. For example, with skin on fingerprints or palm prints, pores are generally detectable in the 3D surface map, as seen in FIG. 12b. When such expected features are not detected or detected in a greater than or less than expected amount, it is a possible indication of a fake biometric.

In an embodiment, the 3D biometric image sensor 102 captures 3D biometric image data and the 3D image processing module generates a 3D surface map in step 322 of FIG. 10. In step 324, the surface map is processed to detect one or more biometric features, such as skin pores, ridges, furrows (also called valleys), or other minutiae, in a subset of the surface map. The 3D image processing module 104 determines in step 326 whether certain expected biometric features are present and if so, whether within an average number range. For example, an average range of the number of pores or other minutiae in a fingerprint is measured with variances. The 3D image processing module 104 determines whether one or more biometric features are detected in a greater than or less number than the measured average range for that feature. When the number of a biometric feature compares unfavorably to a predetermined threshold, e.g. outside of normal ranges, an alarm is raised in step 328. When the number of biometric features compares favorably, the 3D imaging and processing is completed in step 330.

Figure 11:
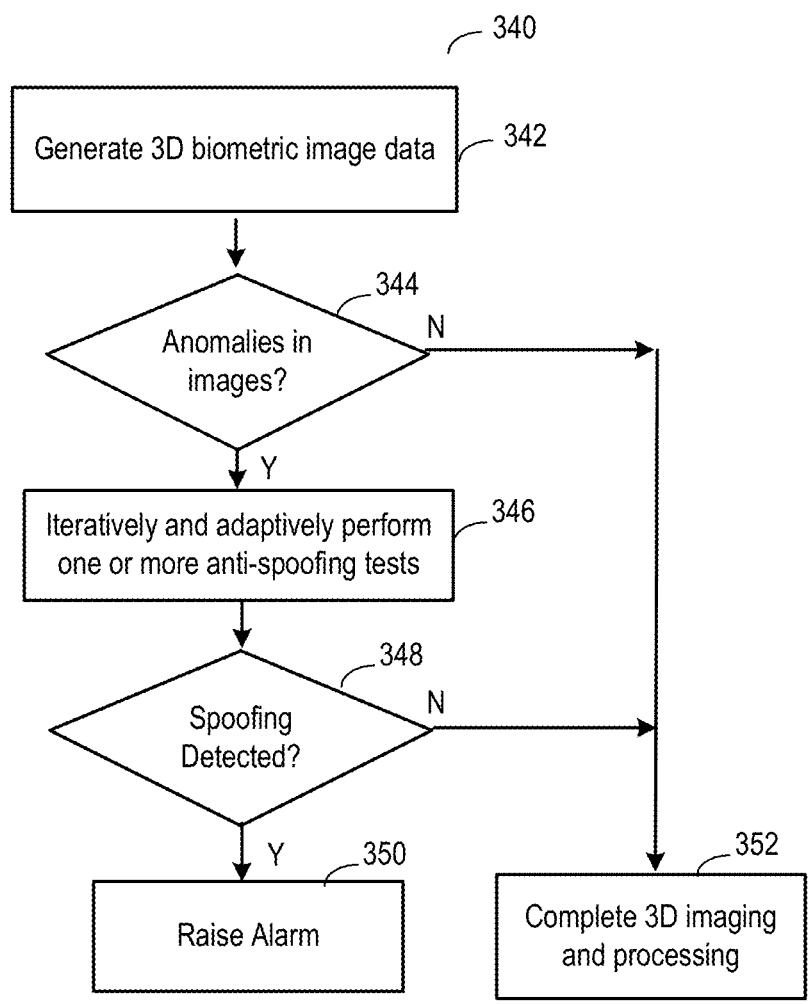
FIG. 11 a logic flow diagram of an embodiment of a method of 3D image capture and processing with an adaptive, iterative anti-spoofing technique.

FIG. 11 illustrates a logic flow diagram of an embodiment of a method 340 of 3D image capture and processing with an adaptive, iterative anti-spoofing technique. In step 342, a 3D biometric image sensor 102 generates 3D biometric image data as described herein. The 3D image processing module 104 generates a texture map and 3D surface map from the 3D biometric image data. In step 344, the 3D image processing module determines whether anomalies are detected from the 3D biometric image data. For example, missing portions of data in a texture map from the image data (such as due to high reflectivity) triggers a decision to perform one or more anti-spoofing tests in step 346. The anti-spoofing tests may include one or more of the tests described herein with respect to FIG. 4, 5, 7, 8, 9 or 10. The anti-spoofing tests are performed in an adaptive, iterative method. For example, based on one or more scans that indicate potential spoofing, one or more other anti-spoof tests are adaptively applied to gain additional information for determining the presence of a fake biometric. The image sensor 102 may be directed to capture additional images to perform the iterative anti-spoofing tests. For example, the image sensor 102 may be directed to project one or more wavelengths of light to perform color spectrum, reflectivity or saturation tests in response to previous scans and tests. In addition, the anti-spoofing techniques described herein may be performed in combination with one or more other anti-spoofing techniques, such as a curvature test, ridge modulation (fractal dimension) test and segmentation test. In step 348, the 3D image processing module 104 determines whether any characteristics indicate spoofing. When sufficient data from iterative anti-spoofing tests indicate that the presence of a faked biometric, e.g. sufficient data compares unfavorably to normal ranges, an alarm is raised in step 350. When after performing sufficient tests, the characteristics compare favorably, the 3D imaging and processing is completed in step 352.

In another embodiment, a 2D biometric image system may employ one or more of the anti-spoofing techniques described herein. For example, the 2D biometric image system is operable to project one or more colors of light at one or more predetermined wavelengths at a 3D object and capture image data for processing. One or more of the anti-spoofing tests described herein may be performed on the 2D image data without or before generation of a 3D surface map. For example, an image processing module may perform a color spectrum analysis, a reflectivity analysis, and a saturation analysis as described herein on the image data to detect a fake biometric or non-live biometric.

FIG. 12a illustrates an embodiment of a subset of a 3D surface map 360. In the example embodiment in FIG. 12a, points of the subset are interconnected by lines to create a mesh for the illustration. A ridge 362 and furrow 364 are shown. Furrow 364 may also be referred to as a valley. By processing the 3D coordinates of the plurality of points, the 3D features types are detected in the 3D surface map. For example, ridge maxima 366a and 366b and furrow minima 368 are shown along a ridge line 370. In another example, a vector field of ridge heights is constructed with each vector including 3D coordinates and a vector angle corresponding to a direction of the ridge at that coordinate. The vector length is then proportional to a ridge height. In another example, as seen in FIG. 12a, the ridge width differs along a length of a ridge. To determine a ridge width, the difference between ridge maxima 366a and ridge maxima 366b is calculated. The ridge width can also be defined as the difference between a mean or average height of slopes of a ridge. The change in ridge widths can be determined to produce a gradient vector field. In another embodiment, a gradient field is calculated that shows changes in ridge height or furrow minima. The shape of a ridge or slopes of a ridge or furrow can also be determined as a type of 3D feature. In another embodiment, the 3D features include a distribution of furrow minima or ridge maxima. 3D features can further include defined features along a ridge edge such as alignment and shape of an individual ridge. The 3D image processing module 104 is operable to determine whether certain expected biometric features are present and if so, whether within an average number range within a subset of the 3D surface map and within expected ranges of size (width, height, length), shape, etc. When the characteristic of the biometric feature compares unfavorably to the predetermined threshold, as shown in FIG. 10, an alarm is raised.

In another embodiment, features relating to pores are extracted from the 3D surface map. FIG. 12*b* illustrates a perspective view of an exemplary subset of a 3D surface map 360 illustrating pores 380. Various pore features include number of pores, distance between pores, size of a pore, shape of a pore and position of a pore on a ridge or furrow. Further pore features include the position of a pore on a ridge or edge of ridge. Again, the 3D image processing module 104 is operable to determine whether certain expected number and placement of pores is present in the 3D surface map and whether size and shape is within an expected range.

Though the 3D image sensor described herein includes using SLI, the anti-spoofing techniques described herein may be used with other type of 3D imaging techniques. For example, another 3D scanner is a time of flight 3D laser scanner that computes the relative coordinates of a 3D surface map from the round trip time of a pulse of laser light. Optical Coherence Tomography, OCT, uses low coherence interferometry with a broadband light source. A conoscopic holography scanner analyzes a diffraction pattern to determine a 3D surface map. And a modulated light scanner detects a reflected light pattern to generate a 3D surface map. Other techniques include a stereovision based system, shape from shading techniques and shape from silhouettes techniques. These and other types of two dimensional (2D) and 3D image sensors and systems may implement one or more of the anti-spoofing tests described herein.

As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item, or one item configured for use with or by another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional schematic blocks, and other illustrative blocks, modules and components herein, can be implemented as illustrated or combined or separated into discrete components, application specific integrated circuits, processors executing appropriate software and the like or any combination thereof.

The present invention is described herein, at least in part, in terms of one or more embodiments. An embodiment is described herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements.

The term "module" is used in the description of the various embodiments of the present invention. A module includes a processing module (as described above), a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention are expressly described herein, other combinations of these features and functions are likewise possible. The embodiment described herein are not limited by the particular examples described and may include other combinations and embodiments.

What is claimed is:

1. A method for spoof detection, comprising:
obtaining a three-dimensional (3D) surface map of a biometric object, wherein the 3D surface map includes a plurality of 3D coordinates;
processing the 3D surface map to detect a portion including a biometric feature;
processing the portion of the 3D surface map including the biometric feature to obtain a characteristic of the biometric feature;
determining that the characteristic of the biometric feature is outside an expected range for the biometric feature, wherein outside the expected range indicates a non-living spoof;
in response to determining that the characteristic of the biometric feature is outside an expected range for the biometric feature, processing the 3D surface map to detect another, second characteristic of the biometric feature;
determining that the second characteristic of the second biometric feature is outside an expected range for the second characteristic of the biometric feature, wherein outside the expected range indicates the non-living spoof; and
generating an alarm that indicates the detection of the spoof when both the characteristic of the biometric feature is outside the expected range for the characteristic of the biometric feature and the second characteristic of the biometric feature is outside the expected range for the second characteristic of the biometric feature.

2. The method of claim 1, wherein the characteristic of the biometric feature is a number of the biometric feature and wherein the expected range for the biometric feature includes an average number of the biometric feature in a plurality of sample live biometric objects from different people.

3. The method of claim 2, wherein the number of the biometric feature outside the expected range for the biometric feature is indicative of the non-living spoof, wherein the non-living spoof includes a non-living, faked biometric object.

4. The method of claim 1, wherein the characteristic of the biometric feature is derived from one or more of: a color spectrum analysis, an absorption analysis, a light scattering analysis, a reflectivity analysis, saturation analysis, blurring analysis, a size analysis or shape analysis.

5. The method of claim 1, wherein the characteristic of the biometric feature is a number of pores in the 3D surface map and wherein the expected range for the characteristic of the biometric feature includes an average number of pores in a plurality of sample live biometric objects from different people.

6. The method of claim 5, wherein the second characteristic of the biometric feature is a range of size of the pores in the 3D surface map and wherein the expected range for the second characteristic of the biometric feature includes an average size of the pores in the plurality of sample live biometric objects from different people.

7. The method of claim 1, further comprising:
determining that the characteristic of the biometric feature is within the expected range for the biometric feature; and
completing the processing for identification.

8. A method for spoof detection, comprising:
receiving a three-dimensional (3D) surface map of a biometric object, wherein the 3D surface map includes a plurality of points having 3D coordinates;
processing the 3D surface map to detect a 3D feature within a subset of the 3D surface map;
determining a number and a size of the 3D feature within the subset of the 3D surface map;
determining that the number of the 3D feature compares unfavorably to a normal range derived from a plurality of sample biometric objects, wherein an unfavorable comparison is indicative of the biometric object being a spoof; and
determining that the size of the 3D feature compares unfavorably to an expected range of the size of the 3D feature, wherein the expected range of the size of the 3D feature is determined from an average of the size of the 3D feature in a plurality of sample biometric objects of different people.

9. The method of claim 8, wherein the normal range is an average range of the 3D feature in the plurality of sample biometric objects of different people and outside the normal range is indicative of a spoof.

10. The method of claim 9, wherein the spoof includes a non-living object used to fake the biometric sensor.

11. The method of claim 8, further comprising:
determining a shape of the 3D feature;
comparing the shape of the 3D feature to an expected range of the shape of the 3D feature or a known shape of the 3D feature, wherein the expected range of the shape of the 3D feature is determined from an average of the shape of the 3D feature in the plurality of sample biometric objects;
determining that the shape of the 3D feature compares unfavorably to the expected range of the shape of the 3D feature or the known shape of the 3D feature.

12. The method of claim 8, wherein the 3D feature further includes a pore.

13. The method of claim 8, wherein the biometric object is a face and wherein the 3D feature includes a facial feature.

14. A system for spoof detection, comprising:
   a biometric sensor operable to capture data of a biometric object, wherein the biometric object is a fingertip; and
   a processing device operable to:
      receive the captured biometric data and generate a three-dimensional (3D) surface map of at least a portion of the biometric object;
      process the 3D surface map to detect an average range of pores and compare the average range of pores to a predetermined spoof threshold, wherein the predetermined spoof threshold is outside an average range of pores in each of a plurality of fingertips from different persons; and
      generate an alarm for a spoof biometric detection when the average range of pores in the fingertip compares unfavorably to the predetermined spoof threshold.

15. The system of claim 14, further comprising:
   a memory that stores the predetermined spoof threshold, wherein the predetermined spoof threshold indicates a non-living object including a fake biometric.

16. The system of claim 14, wherein the 3D object is a fingertip and wherein the processing device is further operable to:
   determine the average range of pores in each of a plurality of fingertips from different persons; and
   set a number outside the average range as the predetermined spoof threshold.

17. The system of claim 14, wherein the processing device is further operable to:
   process the 3D surface map to detect a 3D feature including at least one of: ridge continuity or ridge orientation;
   determine a characteristic of the detected 3D feature, wherein the characteristic of the detected 3D feature includes abnormalities indicating chemical or surgical alterations of the detected 3D feature.

18. A method for spoof detection, comprising:
   receiving a three-dimensional (3D) surface map of a biometric object, wherein the 3D surface map includes a plurality of points having 3D coordinates;
   processing the 3D surface map to detect a 3D feature within a subset of the 3D surface map;
   determining a number and a shape of the 3D feature within the subset of the 3D surface map;
   determining that the number of the 3D feature compares unfavorably to a normal range derived from a plurality of sample biometric objects, wherein an unfavorable comparison is indicative of the biometric object being a spoof; and
   determining that the shape of the 3D feature compares unfavorably to an expected range of the shape of the 3D feature or the known shape of the 3D feature, wherein the expected range of the shape of the 3D feature is determined from an average of the shape of the 3D feature in the plurality of sample biometric objects.

* * * * *